(12) United States Patent  
Anvari

(10) Patent No.: US 8,787,438 B1  
(45) Date of Patent: *Jul. 22, 2014

(54) RECONDITIONING EQUALIZER FILTER FOR NON-CONSTANT ENVELOPE SIGNALS

(71) Applicant: Altera Corporation, San Jose, CA (US)

(72) Inventor: Kiomars Anvari, Walnut Creek, CA (US)

(73) Assignee: Altera Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/138,959

(22) Filed: Dec. 23, 2013

Related U.S. Application Data

(63) Continuation of application No. 11/603,679, filed on Nov. 24, 2006, now Pat. No. 8,619,847.

(51) Int. Cl.  
*H03H 7/30* (2006.01)

(52) U.S. Cl.  
USPC ........... 375/232; 375/229; 375/230; 375/231; 330/149; 330/150; 330/151; 330/152; 455/114.2; 455/114.3; 455/127.1; 455/127.2

(58) Field of Classification Search  
CPC ............ H04L 27/368; H04L 25/03343; H03F 1/3247; H03F 2201/3233; H03F 1/3294  
USPC .......................... 375/232–233, 260, 295–297; 330/149–152; 370/203–208  
See application file for complete search history.

(56) References Cited

U.S. PATENT DOCUMENTS

| | | | | |
|---|---|---|---|---|
| 5,485,120 A * | 1/1996 | Anvari | | 330/151 |
| 5,594,385 A * | 1/1997 | Anvari | | 330/149 |
| 5,610,554 A * | 3/1997 | Anvari | | 330/52 |
| 5,986,499 A * | 11/1999 | Myer | | 330/52 |
| 7,142,831 B2 * | 11/2006 | Anvari | | 455/114.2 |
| 7,146,138 B2 * | 12/2006 | Anvari | | 455/114.3 |
| 7,394,849 B2 * | 7/2008 | Ibragimov et al. | | 375/233 |
| 7,433,421 B2 * | 10/2008 | Shako et al. | | 375/296 |
| 7,649,927 B1 * | 1/2010 | Anvari | | 375/150 |
| 7,848,403 B1 | 12/2010 | Anvari | | |
| 2004/0203540 A1 * | 10/2004 | Anvari et al. | | 455/114.3 |
| 2004/0232985 A1 * | 11/2004 | Itahara | | 330/149 |
| 2005/0141408 A1 | 6/2005 | Anvari | | |
| 2005/0157814 A1 * | 7/2005 | Cova et al. | | 375/297 |
| 2005/0185723 A1 | 8/2005 | Anvari | | |
| 2005/0195916 A1 | 9/2005 | Anvari | | |
| 2007/0147490 A1 * | 6/2007 | Okamoto et al. | | 375/232 |

* cited by examiner

*Primary Examiner* — Daniel Washburn  
*Assistant Examiner* — Eboni Hughes  
(74) *Attorney, Agent, or Firm* — Ropes & Gray LLP; Jeffrey H. Ingerman

(57) ABSTRACT

A technique for a reconditioning equalizer filter for non-constant envelope signals is described. The input to a transmitter chain is modified by a reconditioning equalizer filter, prior to being applied to the transmitter. The reconditioning equalizer filter modifies and smoothens the amplitude of the signal. The modified and smoothened signal has its peaks reduced which results in lower Crest Factor. The input to the reconditioning equalizer filter could be a baseband, intermediate frequency (IF) or radio frequency (RF) signal. When the signal is an IF or RF signal, it needs to be down-converted to baseband before being applied to the reconditioning equalizer filter. The reconditioning equalizer filter could be performed in a digital or analog domain.

5 Claims, 4 Drawing Sheets

RECONDITIONING EQUALIZER FILTER FOR NON-CONSTANT ENVELOPE SIGNALS

CROSS REFERENCE TO RELATED APPLICATION

This is a continuation of, commonly-assigned U.S. patent application Ser. No. 11/603,679, filed Nov. 24, 2006, now U.S. Pat. No. 8,619,847, which is hereby incorporated by reference herein in its entirety.

BACKGROUND OF INVENTION

The present invention relates to a reconditioning equalizer filter to boost the output power of a wireless or wireline transmitter. The reconditioning equalizer filter input could be a baseband, intermediate frequency (IF), or RF signal, and its output is the peak-reduced and smoothened baseband signal that can be up-converted to IF or RF. In any wireless/wireline communication system one of the critical sub-systems is the transmitter. This sub-system has a major contribution in cost, power consumption, and size of the system. The main reason is the requirement of communication transmitter for linear components. The higher the linearity, the higher the power consumption, cost and size. In order to minimize the cost, size and power consumption there is a need for techniques that overcome this problem. This invention conquers these challenges by using a simple and accurate reconditioning equalizer filter module used at the input to this sub-system.

SUMMARY OF INVENTION

According to the invention, a reconditioning equalizer filter, for use with any transmitter, uses a plurality of simple and accurate algorithms in conjunction with intelligent signal processing to improve signal handling of any wireless, optical, or wireline transmitter. By intelligent, it is meant that the algorithm has features of restoring the signal emission and quality requirements after applying the reconditioning equalizer filter. The reconditioning equalizer filter uses the transmitter sub-system input which could be a baseband, IF or RF signal, as its input, and reconditions and smoothens the signal before applying it to the transmitter sub-system. The conditioning and smoothening helps to boost the power handling of the transmitter sub-system or acts more linear. The inputs to the reconditioning equalizer filter should be within a limit that can be handled by the reconditioning equalizer filter.

DESCRIPTION OF THE SPECIFIC EMBODIMENTS

Figure 1:
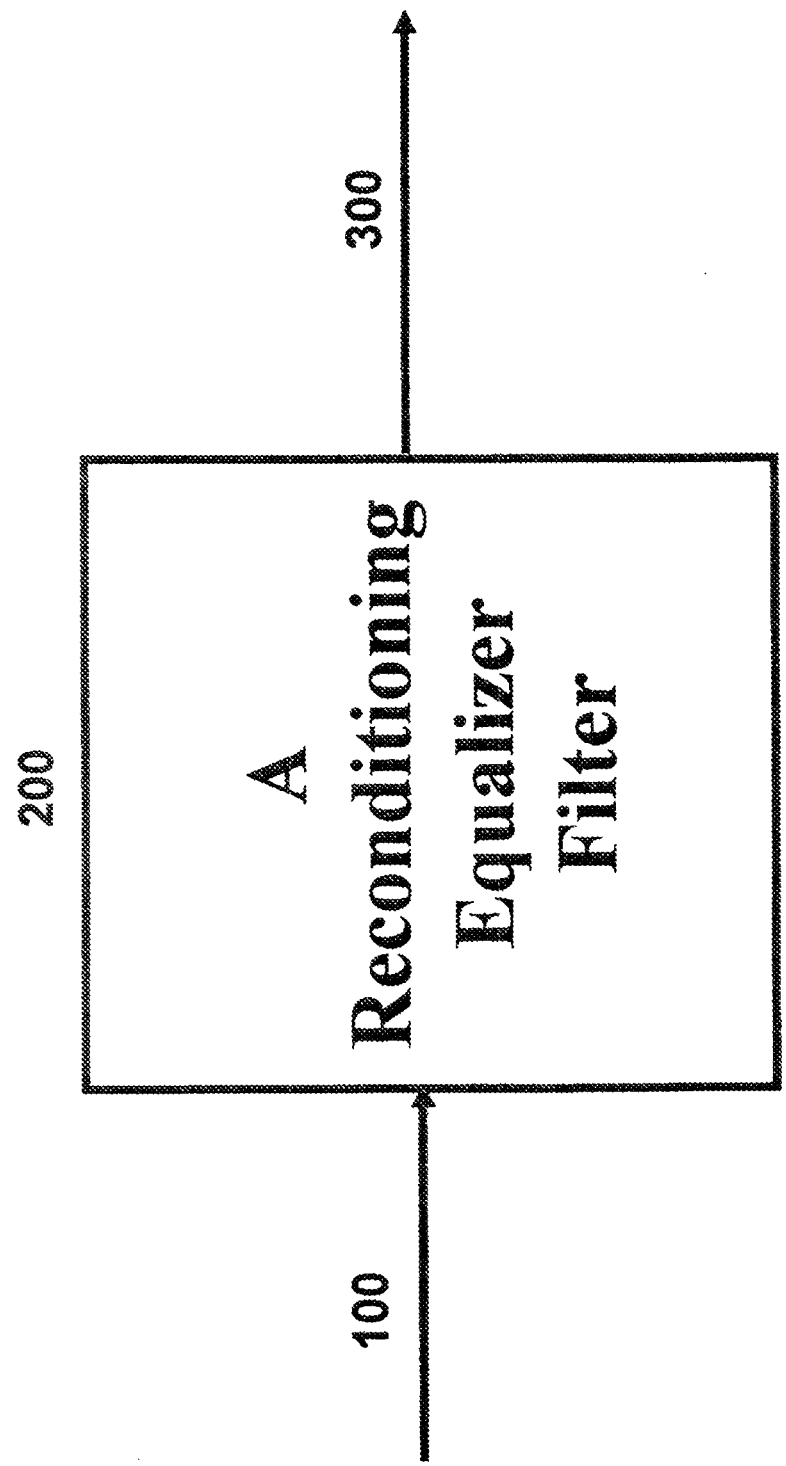
FIG. 1 is an overall block diagram of the reconditioning equalizer filter.

In a first preferred embodiment of the invention, the reconditioning equalizer filter uses sub-harmonic sampling to convert an RF or IF signal to a digital baseband signal. In a second preferred embodiment, the baseband signal's amplitude is conditioned and smoothened using a reconditioning equalizer filter. In a third embodiment, the peak reduction filter uses clipping function. In a fourth embodiment, the peak reduction filter uses phase rotation. In a fifth embodiment, the output of the reconditioning equalizer filter is used as the new input to the transmit sub-system. In a sixth embodiment, both the low pass filter in the feedforward loop and the peak reduction filter are configurable. In a seventh embodiment, a feedforward loop is used to inject in-band signal to the main baseband signal. In an eighth embodiment, a configurable low pass filter is used in the feedforward loop to adjust the in-band signal injected into the main baseband signal. In a ninth embodiment, a controller is used to define the value of gain and delay adjustments as well as other control parameters for various functions of the reconditioning equalizer filter. Referring to FIG. 1, a reconditioning equalizer filter diagram is illustrated. The reconditioning equalizer filter 200 receives its baseband input 100 and produces conditioned and smoothened output 300. The reconditioning equalizer filter performs the following functions:

1. Condition and smoothen the amplitude of the input signal 100 before applying it to transmitter sub-system.
2. Adjust the gain in the signal paths to keep the total gain from input to output of the reconditioning equalizer filter unity.

Figure 2:
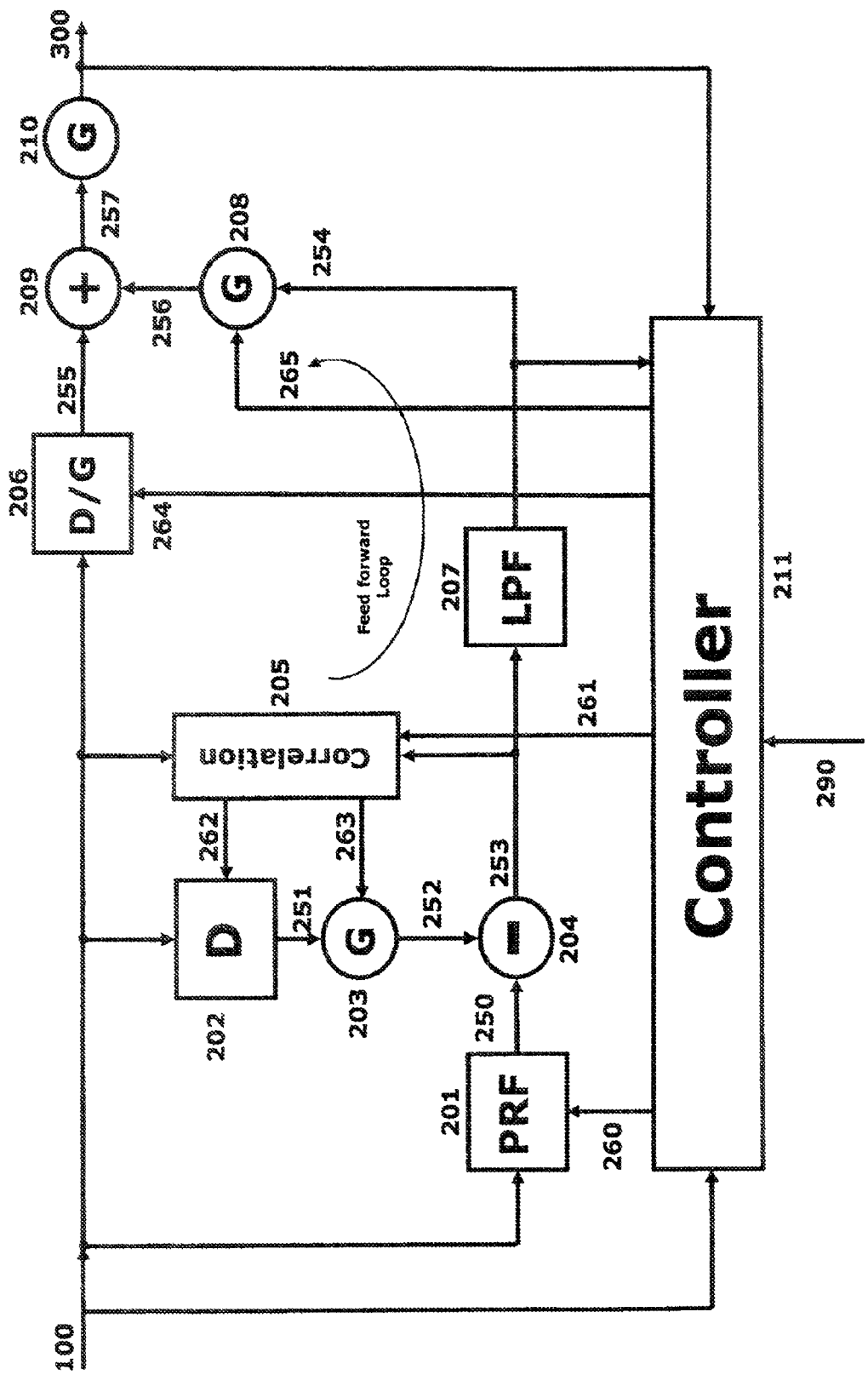
FIG. 2 is the detail block diagram of the reconditioning equalizer filter.

FIG. 2 illustrates the detailed block diagram of the reconditioning equalizer filter unit. The received main baseband signal 100 is applied to Peak Reduction Filter (PRF) 201 to produce signal 250. The PRF 201 receives control signal 260 from controller 211 to adjust the peak reduction. The main baseband signal 100 is delayed by delay block 202 to produce delayed main baseband signal 251. The delayed main baseband signal 251 is gain-adjusted by gain block 203 to produce delay- and gain-adjusted baseband signal 252. The delay- and gain-adjusted baseband signal 252 is subtracted from peak-reduced baseband signal 250 in subtraction block 204 to produce baseband signal 253. The amount of delay 262 and gain adjustment 263 are calculated by the correlation block 205 that uses main baseband signal 100 and signal 253 as its input. The correlation block 205 also receives a control signal 261 from controller block 211 to use to calculate the delay signal 262 and gain adjustment signal 263. The baseband signal 253 is filtered by Low Pass Filter (LPF) 207 to adjust the amount out-of-band signal rejection and produce in-band baseband signal 254. The in-band baseband signal 254 is gain-adjusted by gain block 208 to produced gain-adjusted in-band baseband signal 256. The amount of gain adjustment 265 is provided by controller block 211. The main baseband signal 100 is delay- and gain-adjusted by delay/gain block 206 to produce delay- and gain-adjusted main baseband signal 255. The delay- and gain-adjusted main baseband signal 255 and the gain-adjusted in-band baseband signal 256 are summed in summation block 209 to produce modified main baseband signal 257. The modified main baseband signal 257 is gain-adjusted by gain block 210 to produce conditioned and smoothened baseband signal 300. The main baseband signal 100 and the modified baseband signal 300 are applied to controller 211 to provide the gain and delay parameters needed for the gain blocks and the correlation block.

Figure 3:
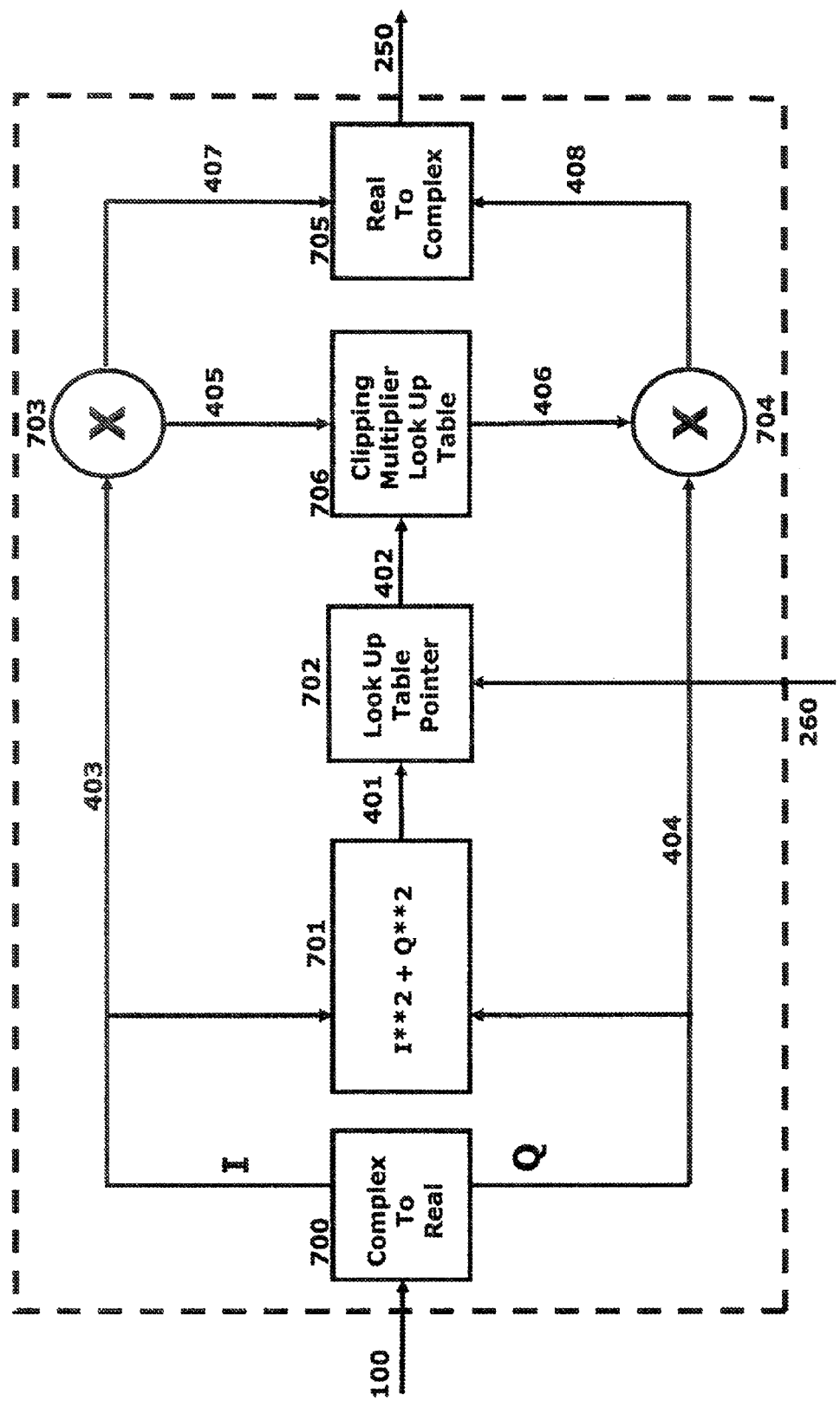
FIG. 3 is the block diagram of peak reduction filter using clipping.

FIG. 3 shows the detailed block diagram of the Peak Reduction Filter (PRF) 201. The main baseband signal 100 is applied to block 700 to be converted to real In-phase (I) 403 and quadrature phase (Q) 404 signals. The "I" 403 and "Q" 404 signals are applied to block 701 to calculated the magnitude 401 of the main baseband signal. The magnitude of the main baseband signal is applied to block 702 to define the lookup table pointer 402 that is being used for the look up table block 706. The pointer 402 selects the in-phase multiplier factor 405 and quadrature multiplier factor 406. The in-phase multiplier factor 405 and the main in-phase (I) signal 403 are applied to multiplier 703 to produce the modified main in-phase signal 407. The quadrature multiplier factor 406 and the main quadrature signal (Q) 404 are applied to multiplier 704 to produce modified quadrature signal 408. The modified in-phase signal 407 and quadrature signal 408 are applied to block 705 to produce the modified main complex baseband signal 250.

Figure 4:
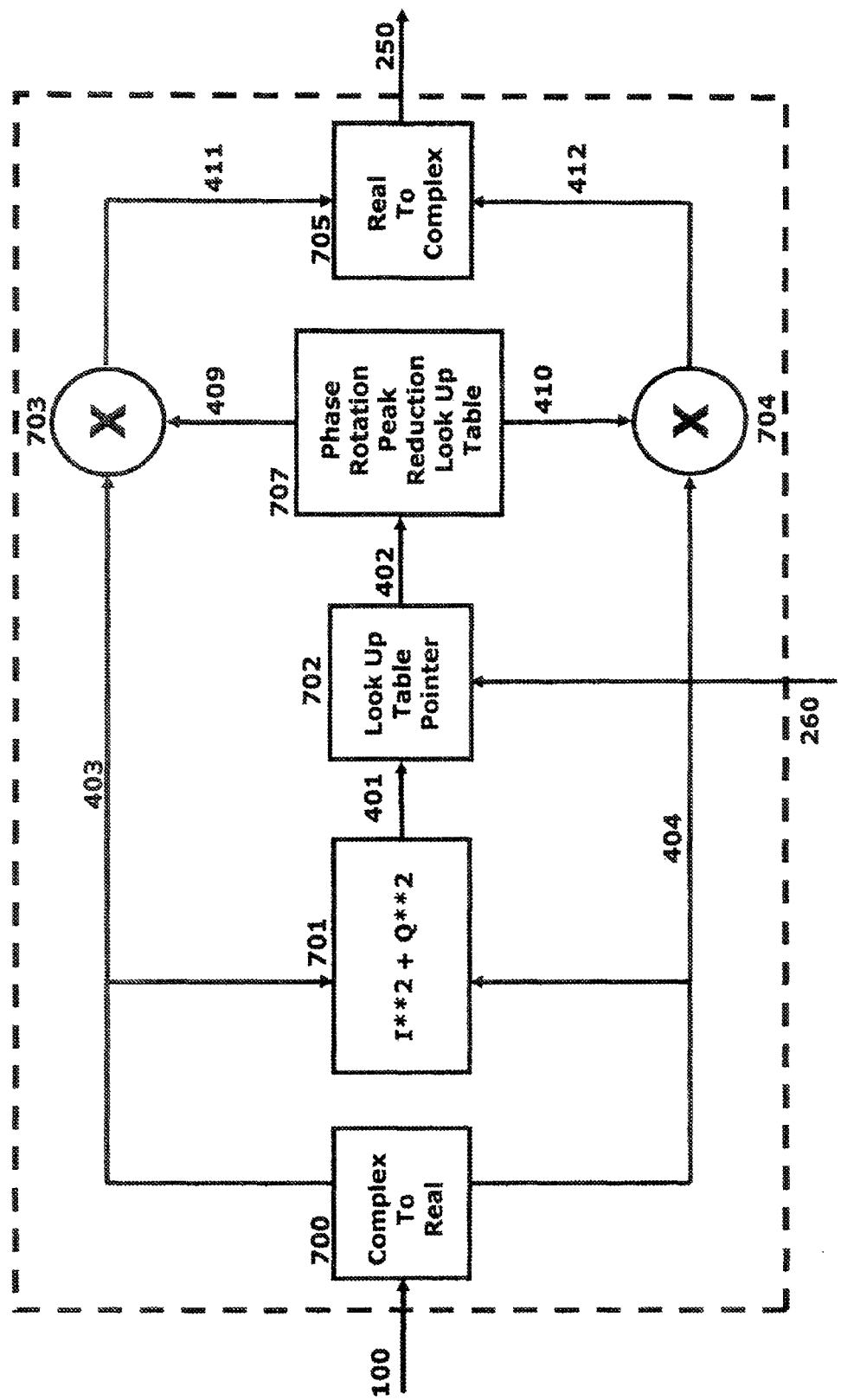
FIG. 4 is the block diagram of the peak reduction filter using phase rotation.

FIG. 4 shows the detailed block diagram of the Peak Reduction Filter (PRF) 201. The main baseband signal 100 is applied to block 700 to be converted to real In-phase (I) 403 and quadrature phase (Q) 404 signals. The "I" 403 and "Q" 404 signals are applied to block 701 to calculated the magnitude 401 of the main baseband signal. The magnitude of the main baseband signal is applied to block 702 to define the lookup table pointer 402 that is being used for the lookup table block 707. The lookup table block provides in-phase and quadrature phase angles whose "COSINE" 409 and "SINE" 410 are used in multipliers 703 and 704. The pointer 402 selects the in-phase "COSINE" component 409 and quadrature "SINE" component 410. The in-phase "COSINE" component 409 and the main in-phase (I) signal 403 are applied to multiplier 703 to produce the modified main in-phase signal 411. The quadrature "SINE" component 410 and the main quadrature signal (Q) 404 are applied to multiplier 704 to produce modified quadrature signal 412. The modified in-phase signal 411 and quadrature signal 412 are applied to block 705 to produce the modified main complex baseband signal 250.

What is claimed is:

1. A reconditioning equalizer method for use with non-constant envelope signals to enhance the performance of a transmitter, the reconditioning equalizer method comprising:
    delay-and-gain adjusting a main input baseband signal to produce a primary delay-and-gain-adjusted main baseband signal;
    peak-reduction filtering the main input baseband signal to produce a peak-reduced main baseband signal;
    injecting an in-band-and-out-of-band-adjusted baseband signal into the main baseband signal in a feedforward loop, wherein the injecting comprises:
    delaying the main baseband signal,
    gain-adjusting the delayed main baseband signal to produce a second delay-and-gain-adjusted main baseband signal,
    subtracting the second delay-and-gain-adjusted main baseband signal from the peak-reduced main baseband signal,
    correlating the main baseband signal and the result of the subtraction of the second delay-and-gain-adjusted main baseband signal from the peak-reduced main baseband signal to calculate the amount of delay adjustment in the delaying and the amount of gain adjustment in the gain-adjusting,
    low-pass filtering the result of the subtraction of the second delay-and gain-adjusted main baseband signal from the peak-reduced main baseband signal to adjust in-band and out-of-band components in the baseband signal,
    adjusting the gain of the filtered subtraction of the second delay-and-gain-adjusted main baseband signal from the peak-reduced main baseband signal for injection into the primary delay-and-gain-adjusted main baseband signal, and
    summing the primary delay-and-gain-adjusted main baseband signal and the low-pass-filtered and gain-adjusted subtraction of the second delay-and-gain-adjusted main baseband signal from the peak-reduced main baseband signal to produce a modified main baseband signal;
    adjusting the gain of the modified main baseband signal to produce an output; and
    using the main baseband signal, the output of the low pass filter, the output of the reconditioning equalizer filter, and external input to control the peak-reduction filtering, the correlating, the delay-and-gain adjusting, and the adjusting the gain of the filtered subtraction.

2. The method of claim 1 wherein said low-pass filtering is performed using a digital FIR filter.

3. The method of claim 2 wherein said low-pass filtering is performed using a configurable digital FIR filter.

4. The method of claim 1, wherein the peak-reduction filtering uses a phase rotation lookup table to rotate the in-phase "I" component and quadrature phase "Q" component of the complex main baseband signal and uses the magnitude of the main baseband signal to point to the required rotation angle, said peak-reduction filtering comprising:
    using a complex-to-real conversion to produce the in-phase "I" component and quadrature phase "Q" component from the main baseband signal;
    using the in-phase "I" component and quadrature phase "Q" component of the main baseband signal to calculate the magnitude of the main baseband signal;
    using the magnitude of the main baseband signal, and an external control parameter, to produce a pointer to the phase-rotation lookup table, thereby providing from the lookup table, based on the pointer, phase-rotation cosine and sine values for the in-phase "I" component and the quadrature phase "Q" component;
    multiplying the in-phase "I" component of the main baseband signal with the in-phase "I" phase-rotation cosine value to produce a modified in-phase "I" component;
    multiplying the quadrature phase "Q" component of the main baseband signal with the quadrature phase "Q" phase-rotation sine value modified quadrature phase "Q" component;
    using a real-to-complex conversion to produce the peak-reduced main baseband signal from the modified in-phase "I" component and modified quadrature phase "Q" component.

5. The method according to claim 4, wherein at least one of the calculating the magnitude of the main baseband signal, multiplying the in-phase "I" component, or the multiplying the quadrature phase "Q" component, is performed using one of programmable logic, a Field Programmable Gate Array (FPGA), a Gate Array, an Application Specific Integrated Circuit (ASIC), or a DSP processor.

* * * * *